United States Patent [19]
Rowe

[11] Patent Number: 5,228,859
[45] Date of Patent: Jul. 20, 1993

[54] INTERACTIVE EDUCATIONAL AND TRAINING SYSTEM WITH CONCURRENT DIGITIZED SOUND AND VIDEO OUTPUT

[75] Inventor: T. Peter Rowe, Portland, Oreg.

[73] Assignee: Interactive Training Technologies, Hillsboro, Oreg.

[21] Appl. No.: 806,149

[22] Filed: Dec. 10, 1991

Related U.S. Application Data

[63] Continuation-in-part of Ser. No. 583,596, Sep. 17, 1990, abandoned.

[51] Int. Cl.$^5$ ............................................. G09B 19/00
[52] U.S. Cl. .................................................... 434/118
[58] Field of Search ............................. 434/307–309, 434/118; 358/140; 364/419

[56] References Cited

U.S. PATENT DOCUMENTS

| | | | |
|---|---|---|---|
| 4,779,080 | 10/1988 | Couglin et al. | |
| 4,839,743 | 6/1989 | Best et al. | 434/307 |
| 4,937,807 | 6/1990 | Weitz et al. | |
| 4,968,254 | 11/1990 | Gangwere, Jr. et al. | 434/118 |
| 4,994,912 | 2/1991 | Lumelsky et al. | 358/140 |

OTHER PUBLICATIONS

Sound Blaster (1991) user manual.
Speech Thing ® (1986) user manual.

Primary Examiner—Richard J. Apley
Assistant Examiner—Glenn E. Richman
Attorney, Agent, or Firm—Klarquist, Sparkman, Campbell, Leigh & Whinston

[57] ABSTRACT

The system allows a student to randomly select instructional lessons and also provides sound concurrently with the running of an application program. In one embodiment the training system includes an audio unit that incorporates a cassette recorder and includes a tutorial program operating within the computing device along with the application program the student is working with. In another embodiment the system includes a digital data storage device such as a CDROM drive for providing instructional audio or video output concurrent with the running of the application program. Concurrency is provided by transferring audio or video instructional data through the computing device without passing such data through the CPU of the computing device. This allows the CPU to run the application program independently of the playing of the sound or video output.

13 Claims, 14 Drawing Sheets

| PARADOX 3.0 | Introduction to Paradox | Module 1 |

Lesson 1 - SoundWare Training System Overview
Lesson 2 - Introduction to Databases
Lesson 3 - Viewing PARADOX's Screen & Menus
Lesson 4 - Viewing & Moving Around A Table
Lesson 5 - Viewing Multiple Tables
Lesson 6 - Creating a Form
Lesson 7 - Using Help
Lesson 8 - Summary

⎫
⎬ 47
⎭

Select lesson by pressing the UP [↑] or DOWN [↓] arrow keys and then pressing the ENTER key.
Press the ESC key to return to previous menu.

SoundWare - (C) Copyright 1988-1990 by Interactive Training Technologies, Inc.

*FIG. 4*

INTERACTIVE EDUCATIONAL AND TRAINING SYSTEM WITH CONCURRENT DIGITIZED SOUND AND VIDEO OUTPUT

RELATED APPLICATIONS

This application is a continuation-in-part of U.S. patent application Ser. No. 583,596, filed Sep. 17, 1990, now abandoned, which is hereby incorporated by reference.

This invention relates generally to interactive computer systems for training students how to use application programs or for educating students using application programs that teach history, science, etc. More particularly, this invention relates to systems that provide audio and video instructions or enhancements to the student concurrently with the running of such application programs.

BACKGROUND OF THE INVENTION

Interactive training and educational systems today, such as the one disclosed in U.S. Pat. No. 4,701,130, typically employ tape players for providing audio instructions to the student as he or she works with an application program running on the central processing unit (CPU) of a computing device. The tape is played directly through an adjoining speaker with no intervention by the CPU required to generate audio instructions. This allows the CPU to run the application program with few interruptions. Interruptions in great number slow down the execution of the application program since the CPU cannot efficiently handle both tasks simultaneously.

A drawback of using a tape player, however, is analog format in which instructions are stored. Analog data requires more space and takes longer to access than data stored on a digital storage device. Training for complex application programs may require multiple tapes as well as digital storage media such as floppy disks containing the training program. The task of switching tapes, loading floppy disks and operating the tape recorder is bothersome and difficult. Any tutorial program that accompanies the instructions must be provided on the separate floppy disks because of the slow data transfer from tape.

Although the use of tape to provide instructions is adequate, the analog data format has limitations that are not present if the data were digital. Such data stored in a digital format can be easily manipulated within a computing device. It can be copied and stored along with other computer programs and data. It can be compressed and decompressed so that it takes less space while stored. It can be transmitted across computer networks already in place. It provides far better storage and playback quality than analog data. Special effects may be carried out with digital data. For example, one can add and echo, vary the pitch, brighten an image, or sharpen or blur a focus using a conventional computing device.

Digital data storage devices can also store far much more data than analog devices such as tape recorders. Current optical data drives—both read only and erasable—are available at relatively low cost and can store on a single disc or equivalent media the contents of a number of tapes.

One possible solution is to use a compact disc audio (CD) player in place of the tape player. Compact discs, which are the data storage medium played on a CD player, can store immense amounts of digital data. CD players include hardware for producing sound through an adjoining speaker, just as is presently done with a tape player. But because of the "red book" data format used with present CD players, they provide only an hour of output in the form of high fidelity sound. That format requires over 44,000 samples per second of sound, with two bytes of digital data per sample.

Another possible solution is to use a hard disk drive or a CDROM drive. A CDROM drive uses a different type of disc called a CDROM disc which provides the same digital data storage capabilities as a hard disk drive. CDROM drives are not limited to the "red book" audio standard but can also store and transfer raw digital data. This data could be digitized sound data that has been sampled at a lower rate than the 44.1 kHz standard of red book audio. This allows the storage of more than an hour of digitized sound on a single CDROM disc, at a reduced sound quality.

Unlike the tape recorder or the CD player, however, a digital data storage device must pass its digital data into a computing device. The digital data read into the computer can then be sent to an audio device or a video device that matches the digital data representation. This constraint affects the computing device's ability to effectively provide audio instructions concurrently with running of an application program for two reasons. First, as mentioned, transferring data from the digital data storage device to the audio or video device to generate sound or to display visual effects consumes a large amount of CPU time. This affects the CPU's ability to run an independent application program without significant interruption. Secondly, the application program may interrupt the CPU to access a disk drive, while the CPU is attempting to transfer the audio or video data. This interruption causes gaps in the audible words known as "dropouts" and also produces audible noise. Simultaneous access to the drive and generating sustained sound are difficult since both tasks use the CPU.

SUMMARY OF THE INVENTION

An object of the invention, therefore, is to provide an apparatus for playing sound or video output through a computing device without noticeably affecting the simultaneous running of a computer program by the computing device.

Another object of the invention is to provide such an apparatus in which the instructional data is in a form that can be transmitted through a computer network.

Another object of the invention is to provide an apparatus that uses a digital data storage device such as a standard CDROM drive or hard disk drive as a source of the data for the sound or video output.

Yet another object of the invention is to provide an apparatus in which the instructions and the tutorial program may be provided on a single compact disc or equivalent storage medium.

In accordance with these objects, an apparatus for playing sound or video output through a computing device concurrent with the running of a computer program is disclosed. The apparatus includes a latch for latching digital audio or video sampling data stored within the memory of the computing device. A timer separate from the central processing unit of the computing device transfers the sampling data from the memory into the latch at a sampling rate. A digital-to-analog converter (DAC) then converts the latched sampling data to a corresponding analog signal. With the timer controlling data transfer to the DAC, the central processing unit is thereby free to concurrently run a computer program independent of the playing of sound or video output through the computing device.

With the apparatus, a digital storage device such as a conventional CDROM drive may be used with a medium such as a compact disc to provide the audio or video data to the memory of the computing device. The disc has sufficient storage capacity to contain instructions and a tutorial program on a single piece of media. The apparatus has particular value for educational and training systems, where an application program responds to user commands while instructions are concurrently given.

The method of the invention thus includes providing a timer separate from the central processing unit of the computing device, passing audio or video sampling data from a digital data storage medium into memory of the computing device, and converting the sampling data in memory into a corresponding analog signal representing audio or video output. The conversion of data at the proper rate to accurately reproduce the analog signal is under the control of the timer, thereby freeing the central processing to concurrently run a computer program independently.

The foregoing and other objects, features, and advantages of the invention will become more apparent from the following detailed description of preferred embodiments which proceeds with reference to the accompanying drawings.

BRIEF DESCRIPTION OF THE DRAWINGS

FIG. 4 is a screen display of a lesson selector menu for selecting a lesson from the tutorial program.

DETAILED DESCRIPTION OF PREFERRED EMBODIMENTS

The present invention is an improvement over the software training system described and claimed in U.S. Pat. No. 4,637,797 which is hereby incorporated by reference. Where appropriate, structure common to both systems may be described with reference to the incorporated patent. The educational and training system of the present invention has two operating modes: an author mode, wherein an author creates lessons for an application program, and a play mode, wherein a student listens to the lessons and views a display in the process of learning how to use the application program. While not described specifically herein, the system may also be used with application programs for teaching students about different fields of knowledge such as history and mathematics. The application programs in this environment provide information. For simplicity, both uses are considered "training" herein.

A First Embodiment

Figure 1:
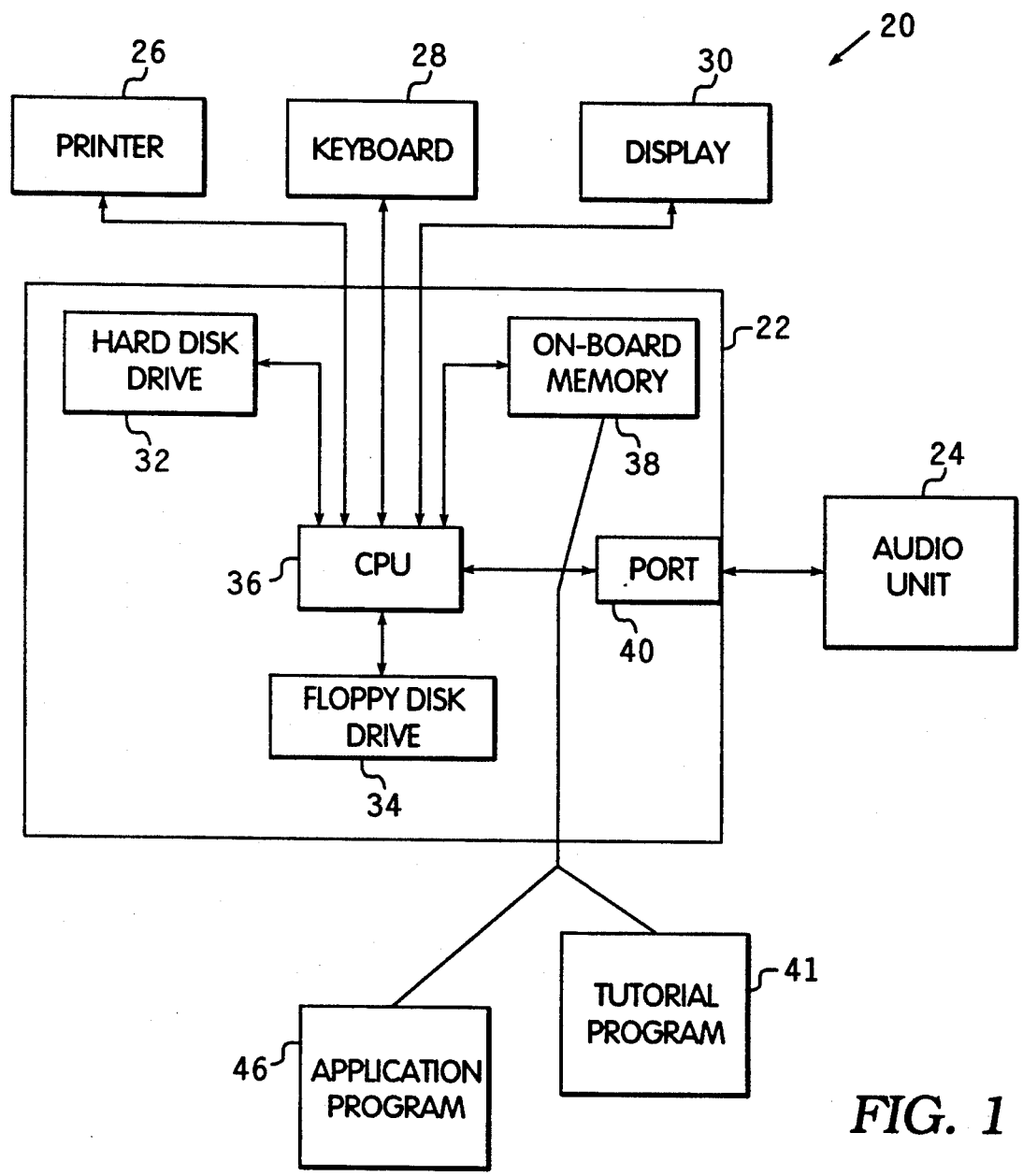
FIG. 1 is a block diagram of a first embodiment of an educational and training system according to the invention.
Figure 2:
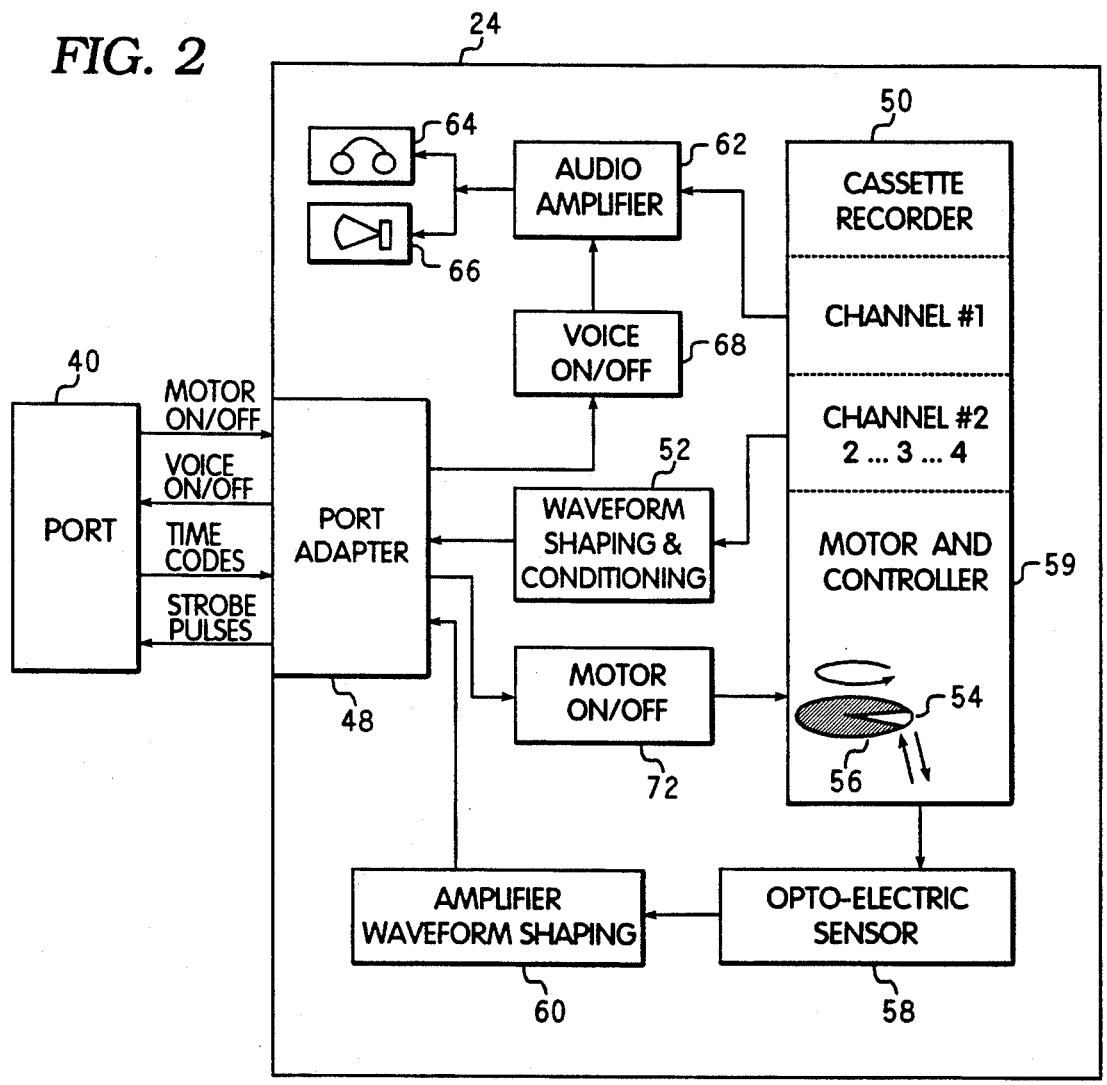
FIG. 2 is a block diagram of the audio unit of FIG. 1.
Figure 3:
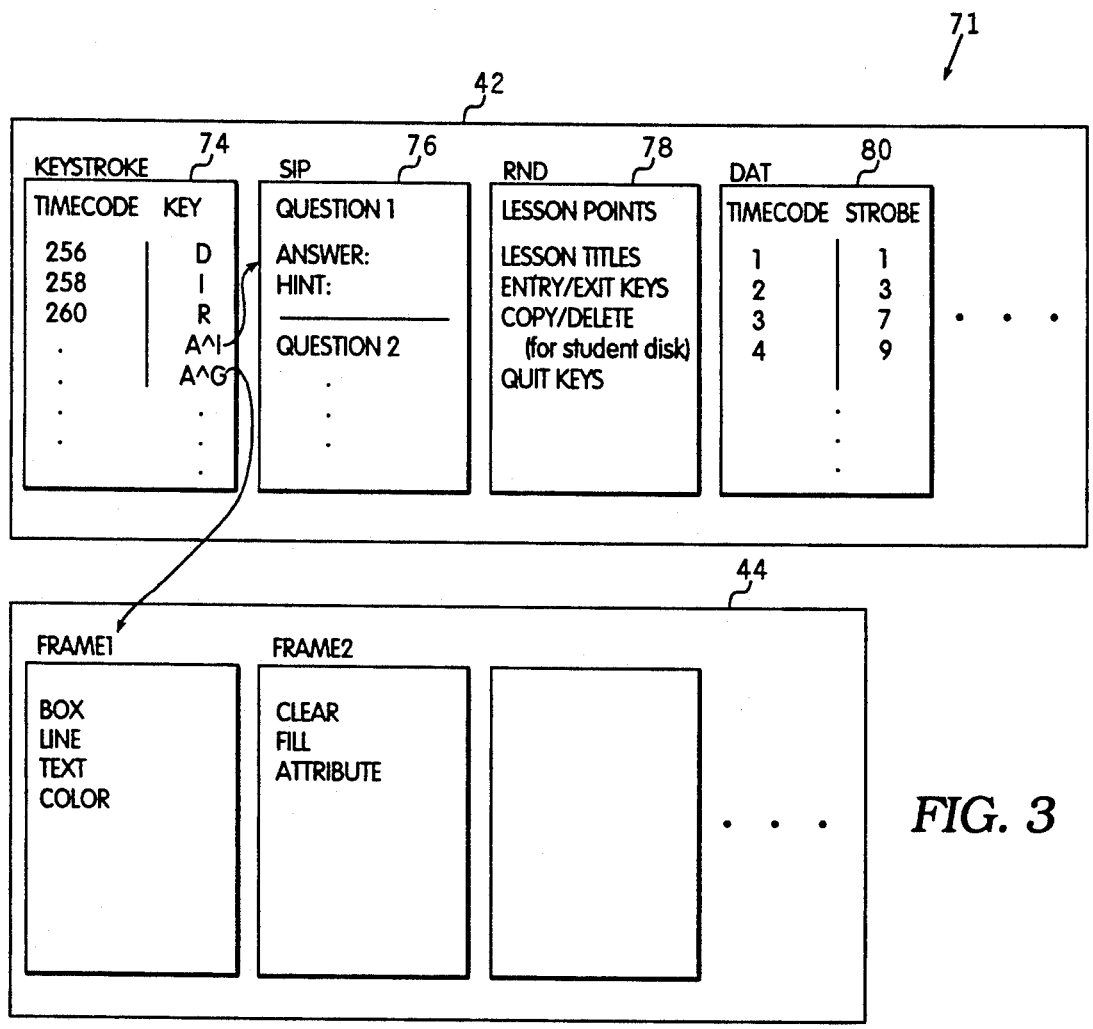
FIG. 3 is a diagram of data structures of the tutorial program of FIG. 1.
Figure 5A:
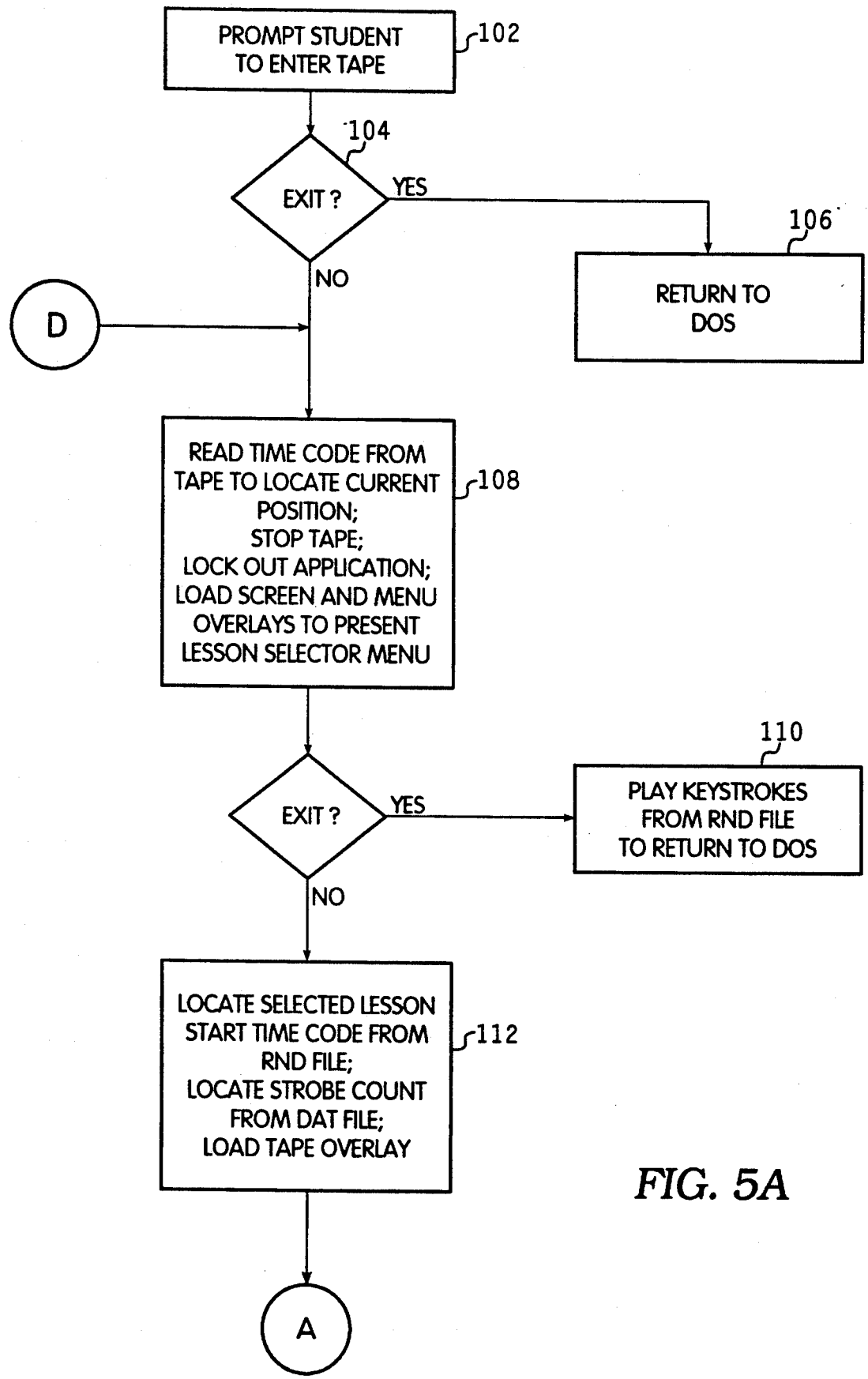
FIGS. 5A-5D are flowcharts of the process for randomly selecting a lesson and corresponding portion of an application program.
Figure 5B:
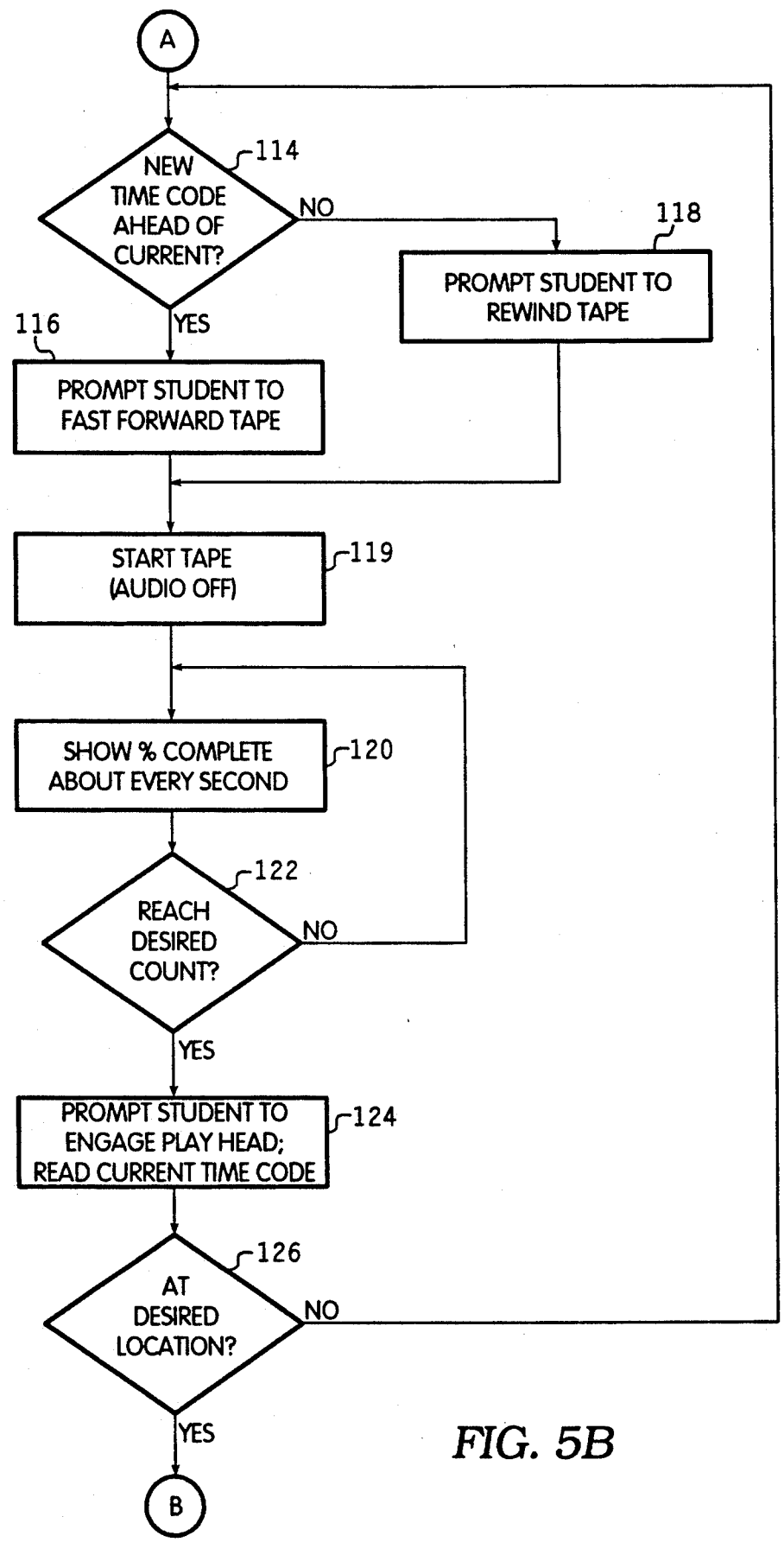
Figure 5C:
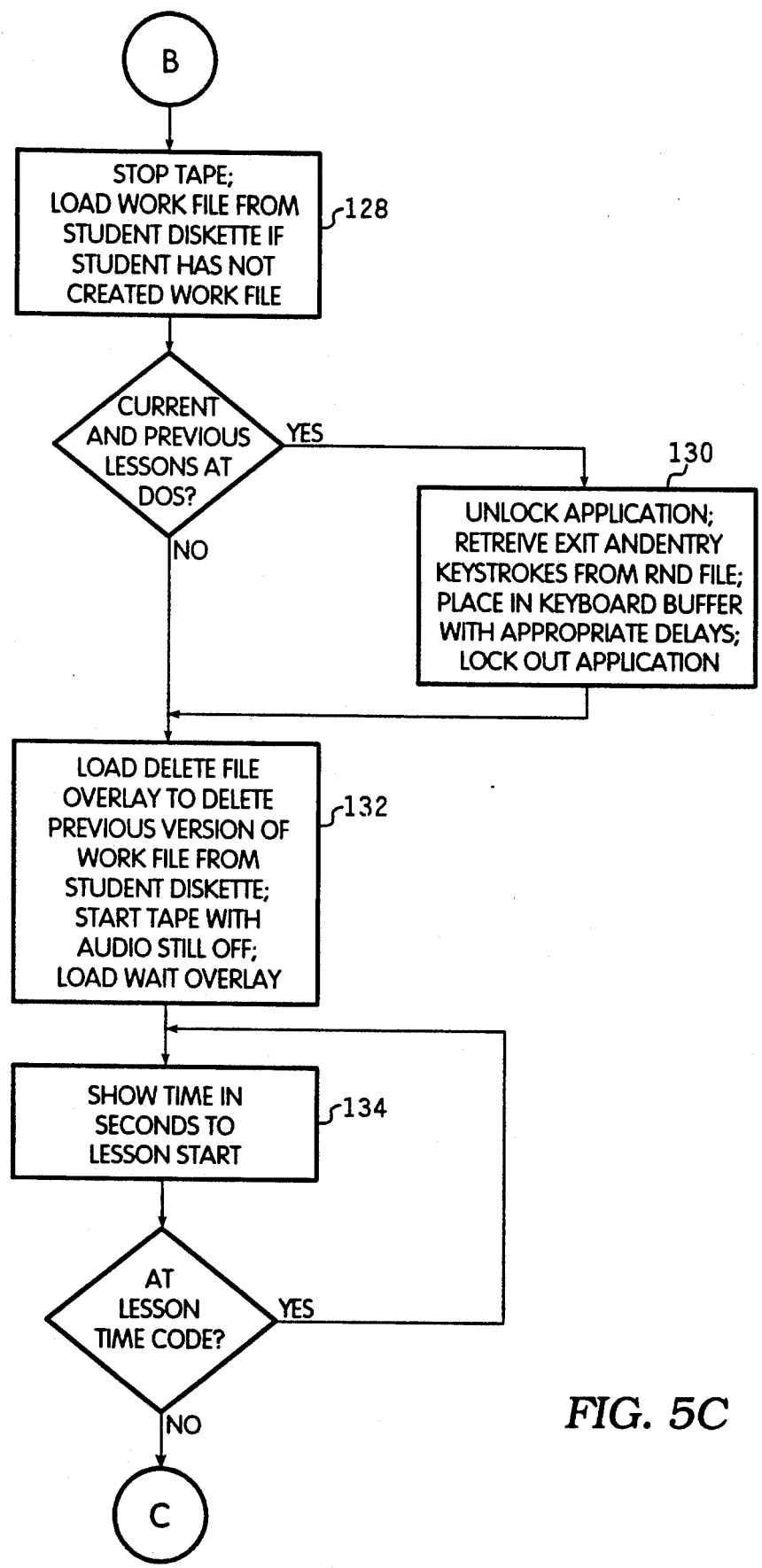
Figure 5D:
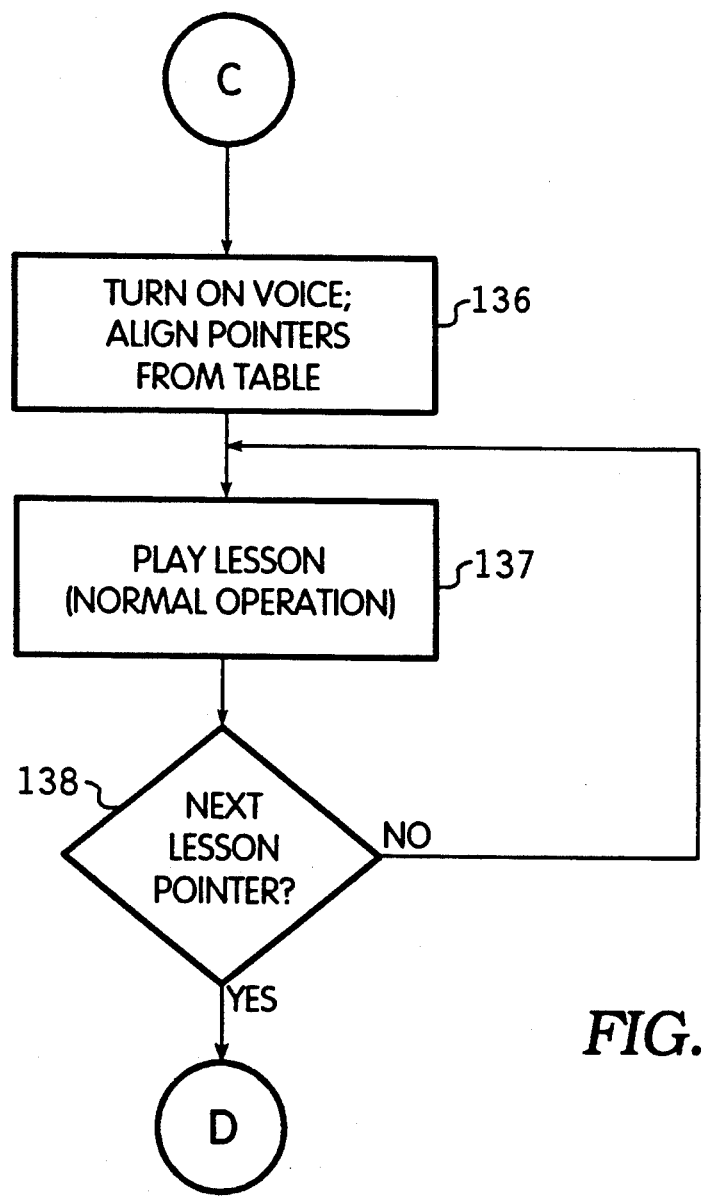

Referring to FIGS. 1-3, there is shown an improved training system 20 that includes, in the present embodiment a computing device 22, audio unit 24 and I/O devices such as a printer 26, keyboard 28 and CRT display 30. Computing device 22 (which includes a hard disk drive 32, floppy disk drive 34, CPU 36, memory 38 and I/O ports 40) and the I/O devices form a conventional data processing system such as a personal computing device. Audio unit 24 is one example of an audio record and playback means which communicates with CPU 36 via a multi-line cable through port 40, which may be serial or parallel. In playback, audio unit 24 gives oral instructions on using an application program. The instructions are partitioned into a group of lessons recorded on the medium of the unit, such as tape. Each lesson corresponds to a portion of the application program. In the system embodiment of FIG. 1, audio unit 24 is a tape recorder that has been modified as shown in FIG. 2 to include additional circuitry. This circuitry, as will be explained below, adapts the recorder for use in the improved training system. A tutorial program 41 within training system 20 is shown in FIG. 3 and includes two programs 42 and 44 that create a number of data structures for use in the invention.

To use the training system 20 with an application program 46, the application program is loaded in a conventional manner from diskettes into the computing device 22 through its floppy disk drive 34 and stored on hard disk drive 32 for retrieval into main memory 38. The tutorial program 41 is loaded and stored in a similar manner in the computing device 22. The tutorial program includes not only programs 42 and 44, but application work files prepared in advance and stored on a student diskette for use in lessons that may require specific work files.

The tutorial program 41 is one example of a means for controlling the playback of lessons from audio unit 24 and for aligning the application program 46 with the lesson to be played back. Program 41 allows a student to randomly select a lesson from the lesson group through means such as lesson selector menu 47 shown in FIG. 4. The lesson selector 47 is displayed on display 30 in a manner to enable a student to select, via the keyboard 28 or other user input device, a lesson or to quit the training session (and application program) entirely if desired. In response to selection of a lesson with lesson selector 47, tutorial program 41 actuates audio unit 24 to move its medium to a position for playing back the selected lesson. The tutorial program 41 also moves the application program 46 to the portion corresponding to the selected lesson so that the lesson and application program are properly aligned. This portion of the application program may be an actual portion or a simulation thereof.

Referring now to FIG. 2, there is shown a block diagram of audio unit 24. A port adapter 48 enables unit 24 to communicate with computing device 22 via I/O port 40. The structure of port adapter 48 depends upon whether port 40 to which port adapter 48 is connected, is a serial port or parallel port. If port 40 is a parallel port, then port adapter 48 need only be a terminal connection because the signal voltages from port 40 are compatible with the voltages used within the circuitry of audio unit 24. If port 40 is a serial port, then port adapter 48 may contain circuitry for translating the signal voltages received from port 40 to desired voltage levels. Port adapter 48 transmits time codes and strobe pulses from audio unit 41 and receives motor on/off and voice on/off signals from computing device 22. The time codes originate from channel two of a medium moving within the audio unit 24, which in this first embodiment of the training system 20 is a tape within stereo cassette recorder 50. The time codes are in sequential order and serve as reference points on the tape. They are fed from the tape through waveform shaping and conditioning circuitry 52 such as a Schmitt trigger to transform them into binary pulses for transmission to computing device 22 in a manner described in U.S. Pat. No. 4,637,797.

The strobe pulses originate from a means for sensing movement of the playback medium. Such means in the present embodiment comprises a reflector 54 attached to a rotatable hub 56 of the recorder mechanism and an opto-electric sensor 58. The hub 56 is coupled to the recorder motor 59 and rotates to turn a tape past the recorder heads. Sensor 58, which may be an infrared transceiver, senses light reflected from reflector 54 as it rotates with the hub 56. Equivalently, reflector 54 may be a magnet or flag and sensor 58 may be a Hall-effect device or micro switch. Sensor 58 produces in turn an electrical signal in the form of a strobe pulse for each rotation. These pulses are passed through amplifier and waveform shaping circuitry 60 such as a Schmitt trigger to transform them into square-shaped pulses. These strobe pulses are then routed to port adapter 48 for transmission to computing device 22.

Other data storage media may not require a sensor such as sensor 58 or the other additional circuitry added to tape recorder 50. CDROMs or hard disk drives, for example, move an absolute distance to a track number, read the track and adjust accordingly. A system embodiment using such media is described herein with reference to FIGS. 9-12. Alternatively, the recorder 50 could be structurally modified to keep the play head engaged to allow the time codes to be read as pulses.

Although both the time codes and strobe pulses convey information regarding movement of the tape, they differ in function. The time codes are each unique and by their values indicate the relative position of the medium. For example, time code 002 refers to one position while time code 240 refers to another position. The time codes are interpreted by tutorial program 41 to determine the position of the tape. However, the time codes may be read only while the tape is moving at its normal playback rate with the recorder head engaged to read the tape. In fast forward or reverse modes of recorder operation, the time codes cannot be read. The strobe pulses, on the other hand, are generated in fast forward and reverse modes of recorder operation. Tutorial program 41 determines the position of the tape by counting the pulses from a known starting position to a desired ending position.

Audio unit 24 also includes other circuitry. An audio amplifier 62 is provided for amplifying the audio signals recorded on channel one of recorder 50. These signals represent the oral (audio) instructions for using the application program 46. The amplified signals are transmitted to a transducer such as a pair of headphones 64 or loudspeaker 66 which transforms them into sound. For reasons to be described, the amplifier 62 is turned off and on to control the broadcast of the audio instructions. The means for controlling audio amplifier 62 is the voice on/off signal. This signal is applied to voice on/off circuitry 68 such as a current drain circuit that controls amplifier 62. In a similar manner, the motor on/off signal controls recorder motor 59. This signal is applied to motor on/off circuitry 72 such as an electronic switch that enables and disables the recorder motor 59.

Referring now to FIG. 3, the purpose of the various files represented by data structures shown therein can now be understood. A control program 42, a part of tutorial program 41, reads data from several files as part of its control process. These files, as will be described, are created in process of creating lessons for the training system. Equivalently the several files could be combined into one or more files containing several data structures. A keystroke file [also known as an event control file (ECF)] 74 comprises a table of predetermined time codes and corresponding keystrokes or other actions for causing an event to occur when a time code in the table is received from audio unit 41. As a time code is read by control program 42 from the tape, program 42 reads file 74 to determine if a keystroke is to be entered into the application program 46 at that point to cause an event to occur. These keystrokes, for example, may be used to advance the application program 46 or to present questions or graphics on the display 30. The top three entries in file 74, for example, produce the DIR command to display the files in the current directory. When control program 42 detects time code 256, it checks file 74, determines that a "D" should be entered, and enters the ASCII and scan key codes into the key buffer of computing device 22 for producing a "D". The control program follows the same process to enter "I" and "R" and <Return>, which completes the command and causes the operating system of computing device 22 to respond with a listing of files in the current directory.

Special keystroke codes may also be entered by program 42 for causing instructional displays to appear on screen. The A I (alternate I) key code shown in file 74 prompts program 42 to retrieve from SIP file 76 a correct answer hint as well as the correct answer itself, immediately after the lesson asks a question. The A ʌ G key code prompts program 42 to call graphics program 44 to display a graphical feature such as highlighting an area of the display 30 or creating a picture.

Encoding the keystroke data in file 74 rather than directly on the tape as done in prior training systems has a number of benefits. First, if a time code is lost in transmission, program 42 can still enter the appropriate keystroke once a following intact time code is received. For example, if time codes 256 and 257 are lost but 258 is received, program 42 recognizes that time code 256 should have also been received and enters the "D" before the "I" key code. Second, recording of the audio information on tapes is much simpler. Instead of recording unique keystroke data on channel two in coordination with the audio signals in channel one, only the time codes need to be recorded. The time codes are the same on each tape and can be easily recorded with a standard process.

To move the playback medium (such as the audio tape in recorder 50) in response to a lesson selection, the control program 42 includes means for determining the distance the medium must travel to be positioned at the selected lesson. The program then causes the audio unit 24 to move the tape to the selected lesson. In the present embodiment such means includes RND file 78 and DAT file 80 in FIG. 3. DAT file 80 holds the relationships between time codes and strobe pulse counts. RND file 78 contains time codes for the starting points of each lesson.

Upon a student's selection of a lesson through lesson selector 47, program 42 reads file 78 to determine the current time code and the time code associated with the selected lesson. It then refers to file 80 to retrieve the pulse counts associated with each time code. It subtracts the two pulse counts to determine the number that it must count to reach the selected lesson. For example, if the tape is presently stopped at time code 280 and the selected lesson is lesson five, the control program 42 refers to RND file 78 to determine the time code for lesson five. It then retrieves from file 80 the pulse counts corresponding to the two time codes and subtracts them to determine the number that must be counted to reach lesson five.

With this count information, program 42 prompts the student on screen to press the fast forward or reverse buttons (depending on desired direction) on audio unit 24 to move the tape at a rate faster than the normal audio playback rate. Alternatively, solenoid-controlled switches may be installed in the recorder 50 so that program 42 may directly move the tape without user intervention. As hub 56 and reflector 54 turn, sensor 58 senses reflections and transmits them as pulses via circuitry 60 and port adapter 48 to program 42 operating within computing device 22. When program 42 has counted the appropriate number of pulses, it generates a motor off signal that is transmitted through port adapter 48 to circuitry 72 to turn off the recorder's motor 59.

The above movement is generally not exact, since the pulses do not always coincide with time codes on the medium. To find the final medium position, program 42 instructs the student to engage the play head by pressing the play button. Program 42 then reads the present time code to determine if it is within a predetermine range of the desired code. If so, the program allows the tape to continue to play until the desired code is read. During this time the program 42 generates the voice off signal to prevent instructions from a non-selected lesson from being voiced. If the present time code is not within the predetermined range, the program 42 computes a new pulse count and repeats the process described above until the desired time code range is read.

RND file 78 also contains data for allowing program 42 to move an application program 46 to the portion corresponding to the selected lesson. This data is sequences of exit and entry keystrokes performed by the program for moving the application program from its present portion through a common program point to the portion corresponding to the selected lesson.

Figure 6:
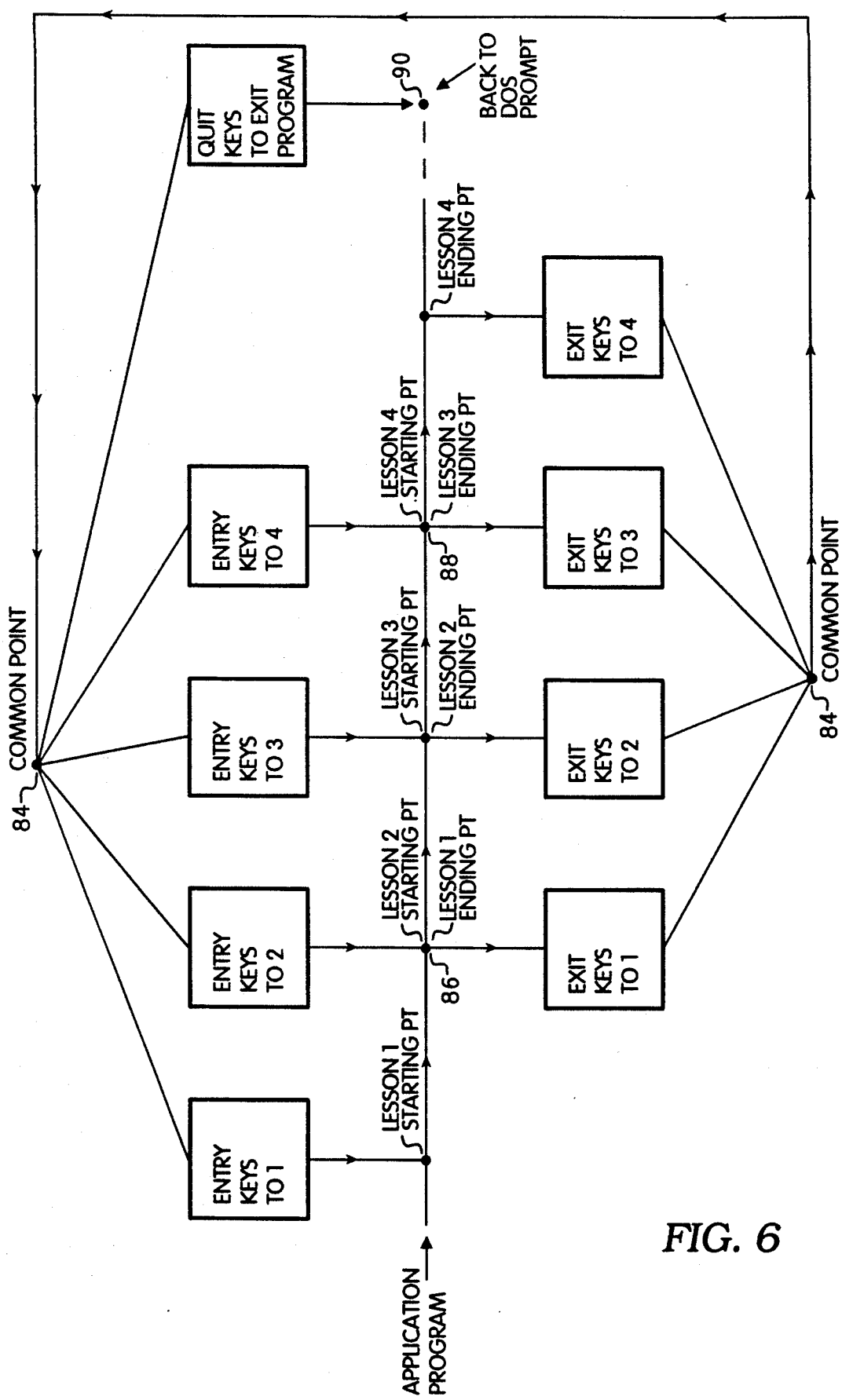
FIG. 6 is a flowchart of the process for moving from one portion of an application program to another portion corresponding to a selected lesson.

FIG. 6 illustrates how this moving process works. Application program 46 is shown as a line broken into segments which represent different portions of the program. At the ends of each segment are starting and ending points (nodes) for a program portion. For example, node 82 is a point in the application program where lesson one ends and lesson two begins. A node does not have to be both a starting and ending point, but is so in the present embodiment to simplify movement to an adjacent lesson.

For each lesson, a student application work file may be required, such as a document being written with a word processor. This application work file must be loaded before the application program and lesson proceed. In the present embodiment, the student builds an application work file from one lesson to another, which is stored during lessons on a diskette present in floppy disk drive 34. However, because a student can select lessons randomly, he may select a lesson out of order, and his application work file may not yet be sufficiently developed for that lesson. To allow for this, system 20 provides a previously created application work file for each lesson on the student diskette. When a lesson is selected, program 42 checks to see if the student-created application work file in memory 38 is sufficient for the selected lesson. If not, the program 42 retrieves the previously created application work file for that lesson from the student diskette.

Before a student has begun a lesson or after he has completed a lesson, the application program will be at a node. After he selects a lesson, program 42 retrieves the necessary exit and entry keystroke data from RND file 78. It then enters the appropriate exit keystrokes into the keystroke buffer for keyboard 28 to bring the application program 46 from its current point to a common point 84. This common point is a point of the program that is easily reached from other points, such as the new, blank document screen displayed by the WORDPERFECT ® word processing program. From there the program 42 enters the entry keystrokes into the keyboard buffer to bring the application program to a desired point, such as the start of the selected lesson. For example, to move from the end of lesson one (node 82) to the beginning of lesson four (node 88), program 42 retrieves from file 78 the exit keystroke codes for lesson one and the entry keystroke codes for lesson four. It then enters the keystroke codes into the keyboard buffer in the manner described. To quit the application program 46 entirely, program 42 retrieves the exit keystroke codes for the present lesson and the quit keystroke codes from file 78. It then enters the keystroke codes in that order to exit the application program 46 (node 90).

Figure 7:
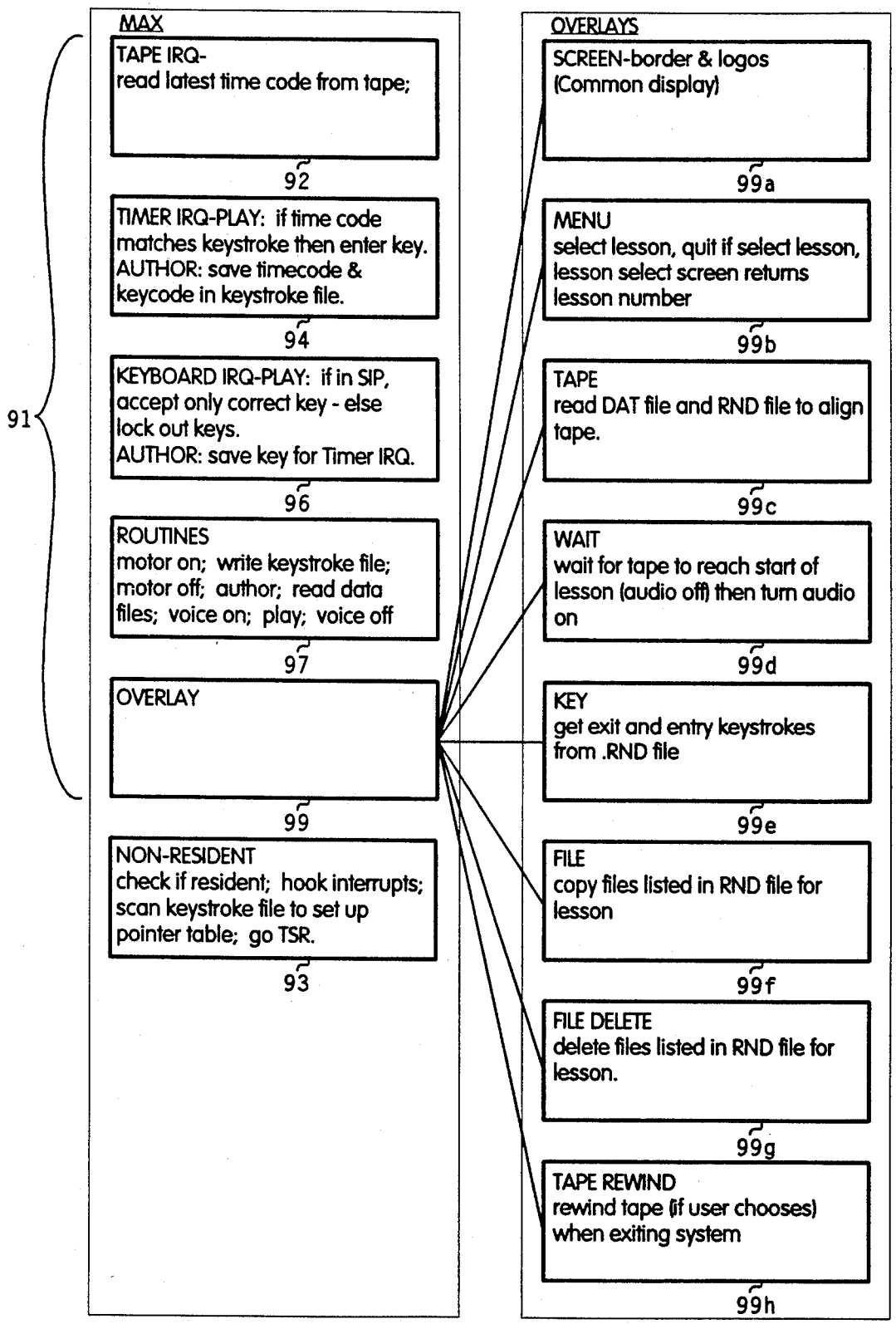
FIG. 7 is a diagram of the software architecture of the tutorial program.

Referring first to FIG. 7, the architecture of program 42 can now be understood. The program includes a terminate and stay resident (TSR) portion 91 and a non-resident portion 93 that are both loaded into memory 38 upon invoking program 41. For clarity only the code portion of TSR 91 is shown. Data is also maintained within TSR, such as keystroke file 74 and a pointer table described below. Non-resident portion 93 first checks to ensure that TSR 91 is not already resident and, if not, then substitutes addresses of the TSR 91 into the computing device's interrupt space of memory 38. This substitution of addresses allows TSR 91 to monitor interrupts received from audio unit 24, keyboard 28 and an internal timer within computing device 22. After responding to an interrupt, TSR 91 will then pass the interrupt onto the ROM BIOS of the computing device 22 if appropriate. Non-resident portion 93 also scans keystroke file 74 in order to create a resident table of SIP and graphics pointers for each lesson. These pointers keep track of the first question and graphics display for each lesson. Upon selection of a lesson, program 42 reads the pointer table to determine where in SIP file 76 or graphics program 44 it should begin retrieving questions or graphics files. In this way, program 42 keeps itself aligned with the selected lesson and the application program. Once it completes the above tasks, nonresident portion 93 turns over control to TSR 91 and is removed from memory 38.

Each of the three interrupts, when received, prompts action by program 42. The tape IRQ 92 is generated by reception of a time code at port 40. This interrupt causes the program to read the port for the latest time code from the tape. The timer IRQ 94 is generated by the computing device's internal timer at periodic intervals. In the play mode, this interrupt prompts the program to compare a received time code with the time codes in file 74 (FIG. 3) to determine if keystroke data should be entered by the program. In the author mode, the interrupt prompts the program to save the time code and keystroke entered by the author in the keystroke file 74. The keyboard IRQ 96 is generated each time a key on keyboard 28 is pressed. In the play mode, this interrupt causes the program to check the keystroke entered by a student against the correct answer and accept only the correct key. In the author mode, the interrupt causes the program to save the entered key for placement in the keystroke file 74 at the next Timer IRQ 92.

Also present in TSR 91 are several other portions of code. Routines 97 carry out the various tasks already described: motor on, motor off, etc., writing to the keystroke file 74 and reading the various data files. Overlay 99 swaps into and out of memory 38 various files stored on disk drives 32 or 34 which, because of memory size, cannot be kept resident in the on board memory. Screen overlay 99a, for example, is called for drawing borders and logos. Menu overlay 99b creates lesson selector 47 and returns the number of the lesson selected by the student to the program 42. Tape overlay 99c aligns the tape by reading the DAT file 80 and RND file 78 to determine the strobe counts for moving the tape to a selected lesson. Wait overlay 99d controls the audio while the tape is being positioned at the start of a lesson. Key overlay 99e fetches the entry and exit keystrokes from the RND file 78. Overlays 99f-h perform file copying, deleting and tape rewind functions.

Referring now to FIGS. 5A-5D, operation of program 42 will now be described. The program first prompts the student through display 30 to insert the appropriate tape into audio unit 24 and then press the play button (102). The student is given the option to exit the tutorial program if he wishes (104,106). Assuming he proceeds, program 42 first reads the time code from the tape to locate its current position and then stops the tape movement. It then locks out application program 46 before loading screen overlay 99a and menu overlay 99b to display lesson selection menu 47. As a final portion of the initial step, program 42 highlights a lesson as the selected lesson, i.e. the lesson that would be played if the student was to press the Enter or Return key on keyboard 28 to re-engage the tape head to the tape (108).

Lesson selector menu 47 also contains an option for exiting the application program (110). If this option is selected, program 42 retrieves the quit keystroke data from RND file 78, enters the data, and returns the system 20 to the operating system prompt (DOS).

The student selects a lesson from the menu 47 by moving the cursor and pressing the Enter key. Program 42 then retrieves the corresponding time code from RND file 78, retrieves the pulse counts from DAT file 80 and computes the necessary count to reach the desired tape position (112). It then checks if the desired time code is ahead or behind the current time code (114) and prompts the student to either press the fast forward button (116) or the rewind button as appropriate (118). The program turns the audio adapter 62 off via the voice off signal as the student starts the tape movement (119). It displays the percentage of tape moved toward the desired position (120) as it repeatedly checks the count of strobe pulses from sensor 58 against the desired count (122). Once it reaches the desired pulse count, program 42 stops the tape and prompts the student to engage the play head to read the current time code (124). If the current time code is not within a predetermined preceding range of the desired time code (126), the program repeats steps (114)–(124).

Once the desired time code is reached, the tape is at its final position for starting the selected lesson. Program 42 then loads the appropriate student application work file, if necessary, for the application program at this point (128). For example, if the selected lesson concerns merging two documents, the student application work file may consist of one of the documents to be merged. In a case where the student application work file is already stored on the student diskette from the previous lesson, the program 42 does not load the previously prepared application work file.

With the tape now positioned at the desired time code and lesson, the program 42 moves the application program to the portion corresponding to the selected lesson (130). It unlocks the application program, retrieves the appropriate entry and exit keystroke data from file 78, and writes the data into the keyboard buffer of computing device 22 with appropriate delay to move the application to the desired point. Program 42 then again locks out the application program.

If the student is required to save his current work file, the previous version of the file is deleted from the student diskette (132). Program 42 then starts the tape. However, the audio output remains turned off until the time code associated with audio start of lesson (which may be different from the initial start) is read.

To alert the student to be ready, the program displays the time in seconds until the lesson begins (134). As that time code is read, control program 42 transmits a voice on signal to audio amplifier 62 to turn on the audio output (136). The program determines from the resident pointer table where the pointers to questions in the SIP file 76 and graphics program 44 should be and aligns the pointers so that the questions and graphic displays associated with the selected lesson will be displayed. The control program then monitors the time codes from the tape to determine from keystroke file 74 whether any keystroke data is to be entered (137). Program 42 also compares the current time code against the next lesson time code (starting node) in the RND file 78 (138). When the two match, the end of the lesson is reached and program 42 branches to step (108), stops the tape and repeats the described process.

Figure 8:
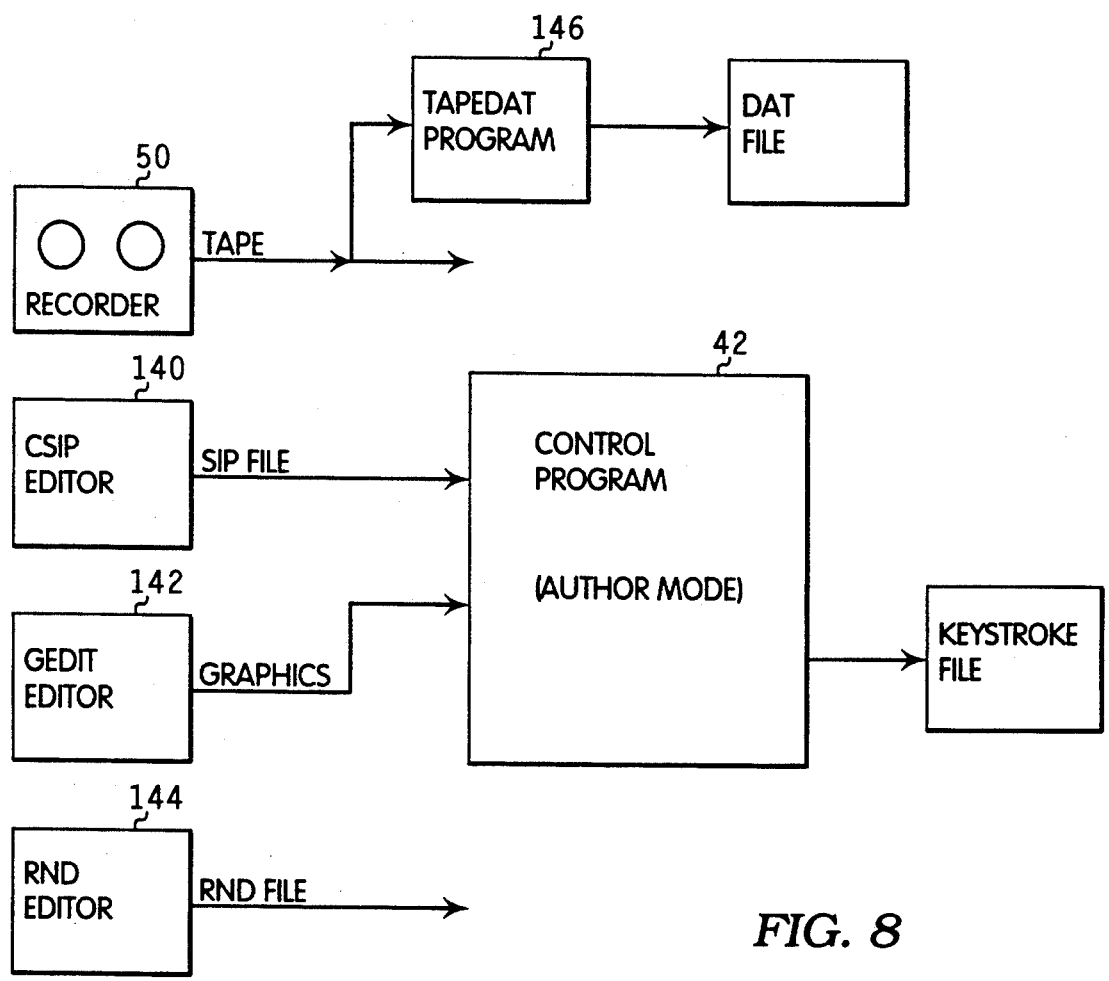
FIG. 8 is a block diagram of the software architecture for creating lessons.

FIG. 8 illustrates the author mode of operation for the training system 20. The author begins by invoking a CSIP editor 140, which prompts him to enter hints and answer to questions on the tape. He then invokes a graphics editor 142 for entering boxes, figures, etc., for the various graphics programs to be stored in program 44 at the desired points in the lessons. With these files complete, the author invokes program 42 in its author mode to create a keystroke file 74. The author inserts a tape with instructions and time codes in recorder 50. When the first time code is read, a beep is sounded to alert the author that he may begin entering keystrokes such as normal application keys, ^I and ^G keystrokes points in the lessons. As the author presses keys, program 42 enters them in file 74 opposite time codes corresponding to the desired points.

To complete the RND file, the author invokes an RND editor 144 which prompts him to enter desired lesson titles, the entry and exit keystrokes for moving from one point in the application program to another, lesson breakpoints, quit keystrokes, etc.

To complete the DAT file, a tapedat program 126 is invoked with the tape rewound and ready to play. As the tape plays, program 146 monitors the strobe pulses and time codes, and enters opposite each time code the latest received pulse count.

A Second Embodiment

FIGS. 9-12 illustrate a second embodiment of the training system using a digital data storage device such as an erasable optical drive, a CDROM drive or a hard disk drive, rather than an analog device such as a tape recorder. In the case of a CDROM drive, the data storage medium is a compact disc. The training system 20 herein works in the manner described above except where noted otherwise.

Figure 9:
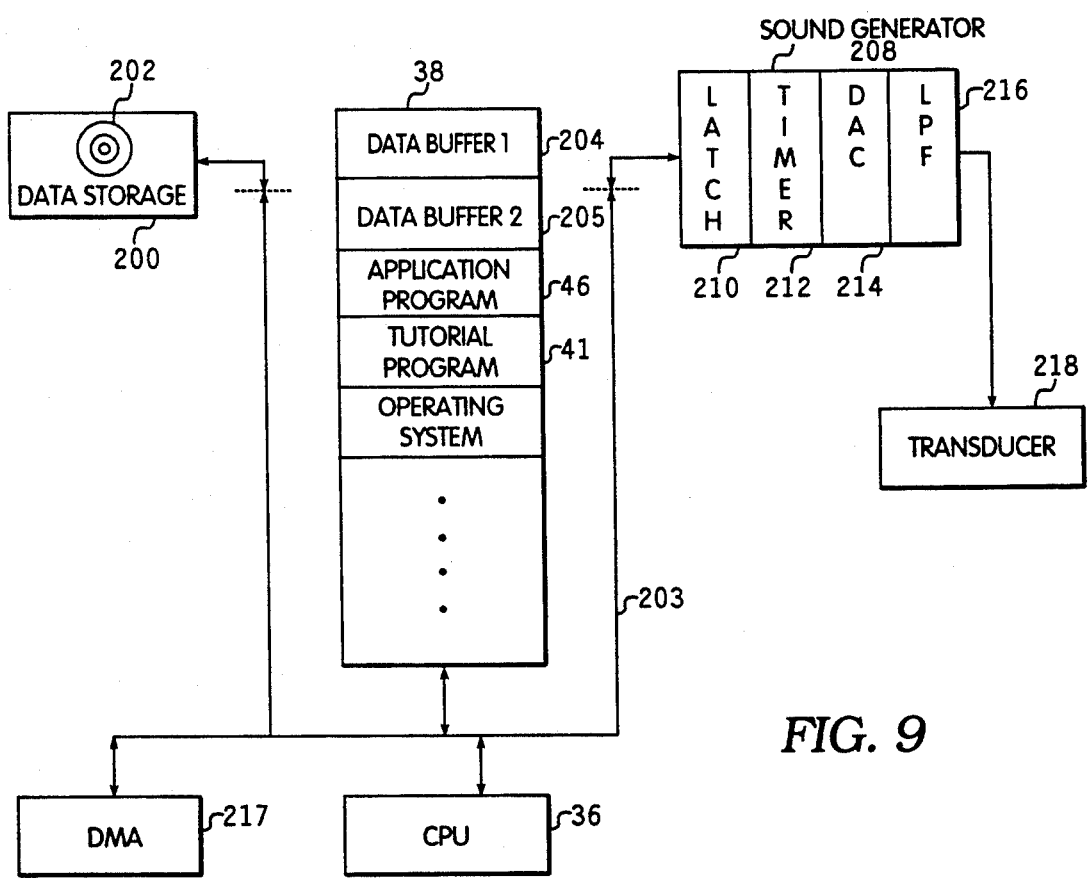
FIG. 9 is a block diagram of a second embodiment of the educational and training system.

FIG. 9 is a block diagram of the second embodiment. The recorder 50 is replaced with a digital data storage device 200 and the training system is reconfigured to play sound or video output through the computing device 22 while the CPU concurrently runs the application program. The data storage device 200 provides access to data on a data storage medium 202 such as a single compact disc that contains not only the instructional sound and video data, but the complete tutorial program 41 as well. The tutorial program is loaded from the data storage medium 202 into memory 38 upon start up of the system and the data for each lesson is individually loaded therein from medium 202 as required. The instructional data is digitally stored as sampling data that, when clocked at the proper rate, accurately reproduces a corresponding analog signal for driving a transducer such as headphones or a video display. The device 200 is coupled to the computing device through a standard interface. In the case of a CDROM drive, this interface could be a conventional small computer serial interface (SCSI) board that connects the drive to the computing device's main bus 203.

As stated, the digital storage device 200 may be a hard disk drive, a CDROM drive, an optical erasable drive, etc., so long as it can store digital data. One of the advantages of CDROM over other digital storage media is its robustness. Once it has been written to, its data cannot be corrupted by the presence of a magnetic field. On the other hand, the data cannot be modified once it is placed on the media.

For program development it is desirable to use a hard disk drive that can simulate a CDROM. The hard disk must be large enough (650 Megabytes) to hold the contents of a CDROM disc. With software (CDMAKE) available from companies such as Reference Technologies Inc. of Boulder, Co., a hard drive can be used during development stages as a CDROM drive. In effect, the hard drive becomes a multiple rewritable CDROM drive for developing audio and video instructional data.

Once development is complete, the data is placed on a CDROM disc for playback through a standard CDROM drive adjacent to the computing device 22.

Within computing device 22 a data storage location such as a first data buffer 204 is provided for receiving audio or video sampling data from the data storage medium 202. The data buffer 204 is preferably set up in memory 38 along with a dual, second data buffer 205. Equivalently, a separate memory device apart from memory 38 could be used as such buffers if desired. Resident along with the data buffers in memory 38 are portions of the application program 46, the tutorial program 41, the operating system and other programs and data that might currently be resident, such as data files of a particular lesson. The CPU 36, which executes these programs, is interconnected with memory 38 via bus 203.

Also coupled to the computing device 22 via its bus 203 is a sound generating device 208 for generating sound concurrently with the running of an application program. Although sound generating device 208 generates audio output, the same principles can be applied for generating video outputs to the display 30 or other device. This sound is reproduced from the data of the medium 202 rather than from data Within the application program, allowing the application program to run independently of the sound generation.

The specific structure of the sound generating device 208 depends how it is to be used with the computing device. The present embodiment includes a latch 210, a timer 212, a digital-to-analog converter (DAC) 214 and a low pass filter 216. The output from the filter 216 may be applied to a transducer 218 such as a set of headphones or a loudspeaker or a display device. The latch 210, which defined herein as a storage location for temporarily storing data, communicates with the first data buffer 204 for latching sampling data received from the first data buffer. The timer 212 is defined herein as a clocking or timing device separate from CPU 36 (and preferably programmable). Timer 212 provides a data transfer signal for transferring the sampling data into the latch 210 at a selected sampling rate, without passing the data through the CPU 36, for accurately reproducing an analog signal corresponding to the sampling data. As will be described, timer 212 runs without the assistance of the CPU in the task of controlling the transfer of data into the latch, allowing the CPU to run the application program concurrently with and independently of the generation of audio instructions by the sound generating device 208. The DAC 214 is coupled to the latch 210 for converting the latched sampling data into a corresponding analog signal that is amplified, modulated and filtered by low pass filter 216. Filter 216 includes an antialiasing amplifier that amplifies the analog signal of DAC 214, filters out the switching transients of the discrete digital samples and provides a volume control for the user. The filtered analog signal is then applied to transducer 218.

It should be understood that FIG. 9 is not intended to show that there must be separate physical devices for each of the blocks therein. For example, the latch 210 and DAC 214 need not be separate components but may be combined into one device. Alternatively, latch 210 may be a buffer within the computing device responsive to timer 212.

Also shown in FIG. 9 is a direct memory address (DMA) device 217 separate from CPU 36 and connected to the bus 203. Once configured by the CPU 36, DMA device 217 transfers digital data from medium 202 into memory 38 (to the first and second data buffers 204, 205) without passing the data through the CPU. Without DMA device 217, CPU would have to use programmed I/O to specifically address the data storage device 200 in order to retrieve data therefrom. Programmed I/O is a time-intensive process and inhibits the CPU 36 from concurrently running an application program at its intended rate. A DMA device or an equivalent can also be used in some cases for transferring data from buffers 204, 205 to the sound generating device 208 without passing the data through the CPU, as will be described.

CPU 36 is programmed through tutorial program 41 to operate the DMA device 217 and the dual data buffers 204, 205 to work in tandem. While data buffer 204, for example, is receiving data from medium 202 under control of device 217, data buffer 205 is providing data to sound generating device 208. When data buffer 205 is empty, the CPU 36 is interrupted to instruct the DMA device 217 to switch the role of the buffers 204, 205 so that data buffer 204 is providing the data while data buffer 205 is refilled with sampling data from the data medium 202 under control of device 217. In this way data transfer from the medium 202 to the sound generating device 208 is continuous, with only momentary involvement of CPU 36 for reconfiguring device 217 and buffers 204, 205.

As mentioned previously, the timer 212 is set to transfer data into a latch at a rate that accurately recreates sound such as voice or music. This transfer rate is the sampling rate at which the data was originally generated from the analog signal. For voice, the sampling rate is about 8 kHz, versus 44.1 kHz for music. Considerable data can be stored on a single compact disc at such a lower sampling rate. To provide even further storage capability, the data can be stored therein using data compression. Algorithms for carrying out such data compression are readily known, such as those described in *Data Compression* by Gilbert Held. These algorithms range from simple Run Length Encoding (RLE) techniques to more sophisticated chrominance subsampling, cosine, and fractal compression. More sophisticated techniques that use interframe technology for motion video are also known. The currently unfinished Motion Pictures Experts Group (MPEG) standard is an example of this. Audio and visual data can be combined in a single stream of data whereby the audio is interleaved with the video. This single stream of data is then compressed for placement on medium 202. During playback, the single data stream is decompressed and the audio and visual data separated and sent to their respective destinations, the computer display or a sound playback device. Data decompression can be performed by the CPU 36 or, preferably, by a separated decompression device such as commercially available digital signal processing (DSP) chips or equivalents. The decompression device would decompress the data prior to its entry into latch 210.

Data compression has the further advantage of reducing the required data transmission bandwidth, the ability to get the data from and to the digital data storage device. With the data compressed 100:1, it can effectively be read from the storage device 100 times as fast as uncompressed data. This is required for reading video data fast enough for acceptable playback performance.

With data compression, the instructional data can be read from a data storage device across a computer network.

Figure 10:
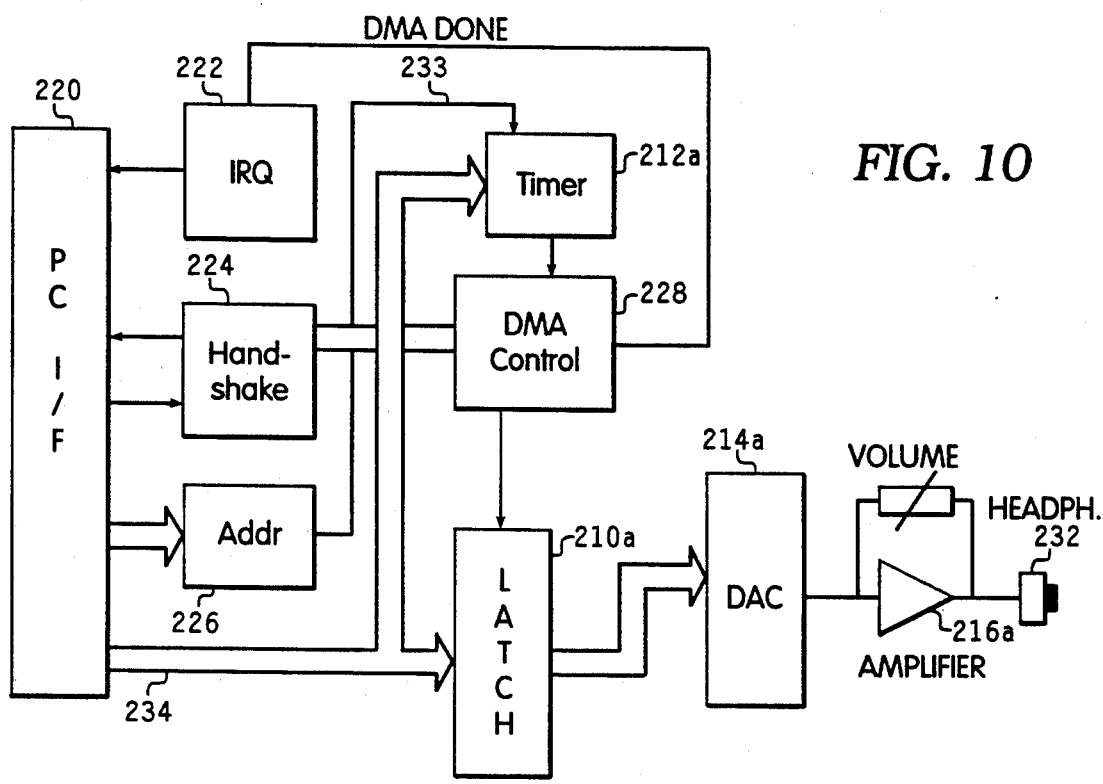
FIG. 10 is a block diagram of an internal version of a sound generating device within the system of FIG. 9.

FIG. 10 is an internal version of the sound generating device 208 suitable for a board that mounts within computing device 22. Control, address and data signals from the computer bus 203 are received by a conventional interface 220 such as a bus transceiver that buffers the signals passing between the device 208 and the computer bus. Connected to the interface 220 is interrupt request (IRQ) logic 222, handshake logic 224 and address logic 226. Also connected to the interface 220 is a timer 212a and a latch 210a. The device 208 further includes a direct memory access (DMA) controller 228, a DAC 214a and a filter 216a that is coupled to a connector 232 for a transducer 218. Timer 212a may be a portion of DMA controller 228, but is shown separately to emphasize its ability to transfer data into latch 210a without the data passing through the CPU 36.

Operation of the sound generating device in FIG. 10 is best understood with reference to the pseudocode in Table I:

TABLE I

Startup Routine:
BEGIN
    READ voice file header containing sample rate and data size;
    PROGRAM soundgenerator DMA Timer with sample rate;
    INSTALL soundgenerator DMA Interrupt Service Routine (ISR);
    ALLOCATE dual data buffers in computer memory;
    CLEAR data buffers;
    START DMA of voice data from data storage device to dual data buffers;
    START soundgenerator DMA;
END;
Soundgenerator ISR:
BEGIN
    WHILE NOT last of data to soundgenerator DO
    BEGIN
        SWAP dual data buffers;
        RESTART soundgenerator DMA;
    END;
    WHILE NOT last of data from data storage device DO
    BEGIN
        RESTART data storage device DMA;
    END;
    UPDATE current location of voice data on data medium
END.

At the beginning of the startup routine, the CPU 36 initializes the sound generating device 208 by reading a voice file header containing the desired sample rate and data size from the data storage medium 202. This sample rate, which is chosen at the time the data is recorded on the medium, provides sufficient quality for the following data (indicated by the data size parameter) without oversampling. For example, if the data following the header represent voice, the data samples are taken about 8,000 times a second, and a second of sound requires medium space for 8,000 bytes (assuming one byte per sample). If the following data represent music, however, the data samples are taken about 22,000 times a second, and a second of sound requires enough medium space for 22,000 bytes. Thus by varying the sample rate and by communicating that rate to the sound generating device 208 in advance to timer 212a, data may be stored more efficiently on and retrieved from the medium 202.

The CPU 36 then programs the timer 212a with the sample rate that was read from the header by addressing the timer via the address logic 226 and address bus 233 and then sending it the sample rate via data bus 234. Timer 212a, rather than CPU 36, thus provides the transfer signal for latching data into latch 210a for DAC 214a.

Following the programming of the timer 212a, the CPU 36 installs an interrupt service routine (ISR) in memory 38 that it executes each time the CPU receives an interrupt from IRQ buffer 222. This interrupt occurs infrequently, only when the data in one of the data buffers 204, 205 is completely transferred to latch 212a. The CPU then continues its startup by clearing the dual data buffers 204 and 205 and starting the transfer of data from the device 200 to the dual data buffers via DMA device 217. It also starts the DMA controller 228 to call for data from one of the buffers 204, 205 on each transfer signal from the timer 212a. The communication with the buffers 204, 205 is handled through the handshake buffer 224 and interface 220. Each time the data buffers 204 or 205 respond that it has sampling data to transfer, DMA controller 228 operates the latch 210a to obtain the sampling data.

Once data buffers 204, 205 are operable to transfer data from the device 200 to the latch 212a, CPU 36 returns to the currently executing application 46 or tutorial program 41. While the CPU executes the application program in response to student commands, DMA controller 228 reads sampling data byte-by-byte from the buffers 204, 205 in the manner described. At the same time, the DMA 217 controls the transfer of data from the data medium 202 to the dual buffers independent of the CPU. The transfer of data from the medium 202 to the dual buffers is at a faster rate (typically as fast as the device 200 and its interface will permit) than the transfer from the dual buffers to the latch 212a (typically about 8,000 times a second) so that the buffers 204, 205 always have data for the latch.

At some point, all of the data initially loaded in the first data buffer 204 may be transferred to latch 210a. When DMA controller 228 is aware that it has come to the end of a data buffer but not to the end of the instructional data, it generates a "DMA done" signal to IRQ logic 222, which in turn generates the described interrupt for the CPU 36. The CPU then enters the interrupt service routine and swaps the data buffers 204, 205 by reconfiguring DMA device 217. Data buffer 205 now communicates with DMA controller 228 while the empty data buffer 204 receives new data from the data medium 202. CPU 36 then restarts both DMA 217 and DMA controller 228 and returns to the application program 46 or tutorial program 41. Timer 212a then continues to latch data for latch 210a from buffer 205. Data is thus always available for the sound generating device 208 and no gaps or noise result. Other than this brief interruption, CPU 36 plays no significant role in the generation of audio or video output through computing device 22.

Figure 11:
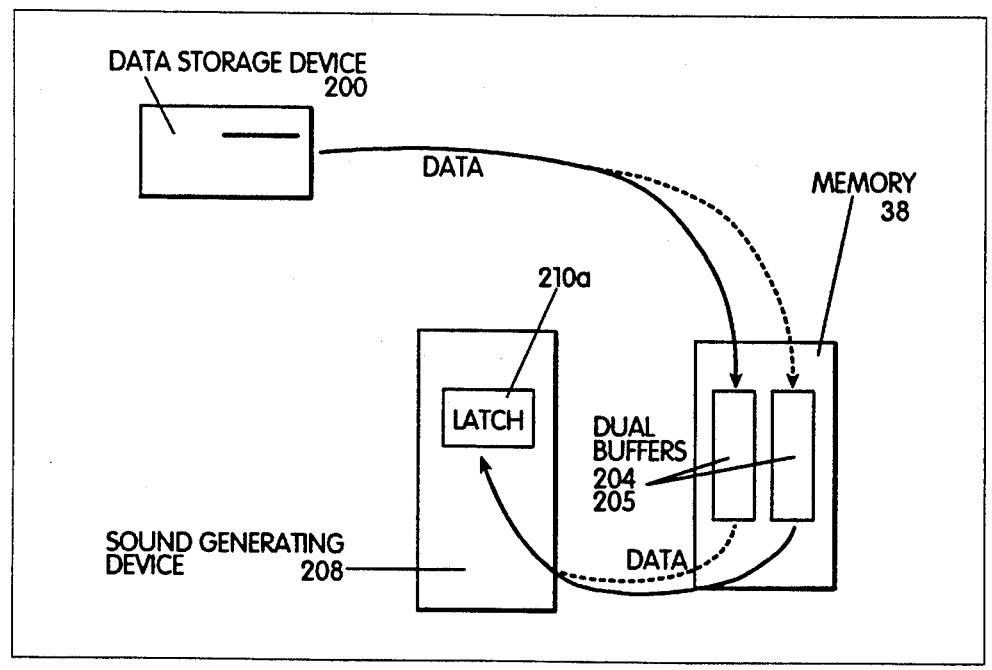
FIG. 11 is an illustration of the data flow through the sound generating device of FIG. 10.

FIG. 11 illustrates the overall flow of digital data from device 200 through the sound generating device 208 of FIG. 10.

As in the first embodiment with tape recorder 50, the system 20 must determine what instructional data is being played through the computing device 22 for coordinating actions of the student or movement of the application program. With the digital data storage device 200 a technique different than that employed in the first embodiment is used. Rather than reading time codes from the medium 202, CPU 36 computes them. DMA device 217 keeps track of the number of bytes transferred from the medium 20 to the sound generating device 208. It does this by counting the number of times a data buffer 204, 205 is filled, knowing the rate at which data is read from the buffer and the size of the buffer. For example, if the buffer holds 8,000 bytes and the timer 212a latches data from the buffer at a rate of 24,000 bytes a second, then the buffer must be refilled every one-third second (the rate of refill is so fast that its time is negligible). The DMA controller keeps an internal time count between fills. The count and time are then combined and the result stored for periodic comparison by the CPU 36 with data in the event control file 74 to determine if an event should occur.

More specifically, a software routine within the tutorial program 41 computes time codes as data is read from the digital data storage device 200. Because the rate at which data is read from device 200 is directly related to the sample rate, time information is deduced from the transfer of this data. The DMA software keeps a count of the number of times buffer 204 is filled. Between these counts an internal timer keeps an absolute time count of up to 1/75th of a second. These counters are zeroed after each refill of the buffer. A continually updated time code is thus always available by taking the current number of filled buffers and dividing by 3 to get complete minutes and seconds. The count value is then added to this computation for a complete time code. All events referenced in the ECF 74 may then specify a simple time code of lessons, minutes, seconds and frames.

Figure 12:
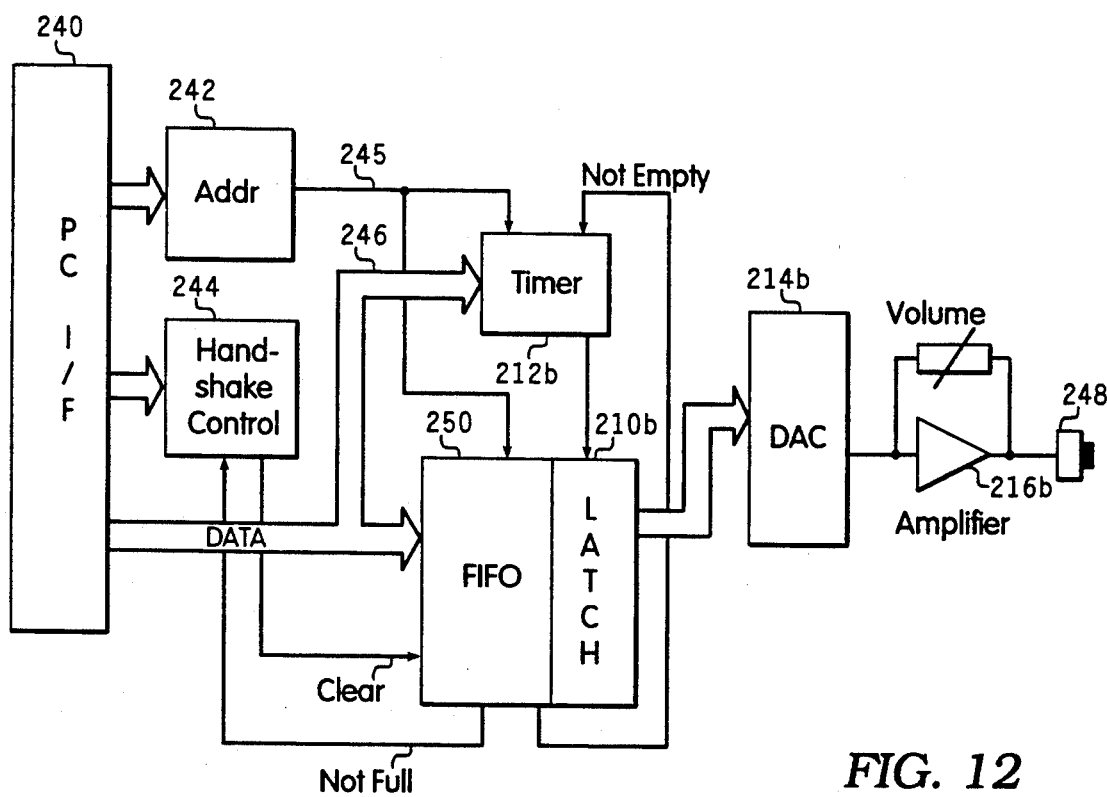
FIG. 12 is a block diagram of an external version of a sound generating device within the system of FIG. 9.

FIG. 12 is an external version of the sound generating device 208 for connection to a port of the computing device 22. Similar to the internal version of FIG. 10, the external version includes an interface 240, address logic 242 and handshake logic 244 connected to the interface 240. The external device also includes a separate timer 212b, a latch 210b, a DAC 214b, a filter 216b and a connector 248. Connected between the latch 210b and interface 240 is another data storage location such as a first in-first out (FIFO) buffer 250 for holding sixteen data samples. FIFO buffer 250 is included because external ports on a typical computing device 22 do not support direct memory transfers of data from memory 38 to the port.

Table II below contains pseudocode describing the operation of the external version of FIG. 12:

TABLE II

Startup Routine:
BEGIN
    READ voice file header of sample rate and data size;
    PROGRAM sound generating device timer with sample rate;
    CLEAR FIFO buffer;
    INSTALL PC timer Interrupt Service Routine (ISR);
    PROGRAM PC timer with sample rate/16 + skew (10%);
    ALLOCATE dual data buffers in memory;
    CLEAR dual data buffers;
    START DMA of data from data storage device to dual data buffers;
    START soundgenerator timer;
    START PC timer;
END;
PC Timer ISR:
BEGIN
    IF (dual data buffers empty) THEN
    BEGIN

TABLE II-continued

```
            SWAP dual data buffers;
            RESTART data storage device DMA;
    END;
    READ (FIFO buffer not full) status;
    IF (FIFO buffer not full) THEN
    BEGIN
            WHILE (NOT last of voice data) DO
            BEGIN
                    REPEAT
                            WRITE voice data to sound
                                    generating device;
                    UNTIL (FIFO buffer full);
            END;
    END;
    UPDATE current location of voice data on data
            medium
END.
```

As in the internal version, the CPU 36 on startup initializes the sound generating device 208 by reading the voice header containing the sample rate and data size and programs the timer 212b with that information via address bus 245 and data bus 246. It then clears the FIFO buffer 250 and installs an interrupt service routine (ISR) that is called each time an internal timer of the CPU 36 (labeled PC Timer in the pseudocode) times out. The CPU finishes initialization by starting the DMA transfer via DMA device 217 from the data storage device 200 to one of the buffers 204, 205, starting the timer 212b, and starting the internal CPU timer. As in the internal version, timer 212b is separate from the CPU 36 and allows data to be transferred to DAC 214b at the appropriate rate without passing the data through the CPU. Also, as in the internal version, memory 38 is operable to receive data from data storage medium without such data passing through the CPU 36.

The internal CPU timer is set to generate an interrupt often enough for the CPU 36 to keep the FIFO buffer 250 from being completely emptied by the latch 210b. In this embodiment, the interrupt is generated about 1,000 times a second for an 8 kHz sample rate. If on interrupt the CPU reads a "not full" signal from the FIFO buffer 250, it addresses the buffer 250 and it fills it almost instantaneously. Timer 212b transfers data out of the FIFO buffer at the sampling rate into the latch 210b, where DAC 214b receives it and converts it to the corresponding analog signal. As the FIFO buffer 250 empties, it generates a "not full" signal that is communicated to the CPU 36 via the handshake buffer 244 and interface 240 on each interrupt. It also generates a "not empty" signal to the timer to keep the timer 212b running. The FIFO buffer 250 is thus operable to receive the sampling data from one of the data buffers 204, 205 at a rate faster than the rate at which the timer 212b transfers data from the FIFO buffer to the latch 210b.

When the internal timer generates an interrupt of the CPU 36, the CPU enters the interrupt service routine described in Table II. First the CPU checks to determine if the data buffer 204 coupled to the FIFO buffer 250 is empty. If so, it swaps the DMA connections and restarts the DMA device 217 so that buffer 204 is refilled from medium 202 and data buffer 205 is providing data to the sound generating device 208. The CPU also checks the status of the "not full" line from FIFO buffer 250 described above. It continues to fill FIFO buffer 250 until the "not full" signal indicates the buffer is now full.

As a further step, the CPU checks the byte count of the bytes transferred to the latch to determine what instructional data is being played through the sound generating device.

In the internal version, the CPU 36 is interrupted for switching buffers 204, 205 once a second for an 8 kHz sample rate and 8 kilobyte buffer size, a rate far lower than if the CPU itself was transferring each data sample from memory 38 to latch 210a (about 8,000 times a second at the minimum). Even in the external version, the interrupt rate is about ⅛ of what it would be if the CPU transferred the data sample-by-sample to the latch 210b. The interrupt rate of 1,000 times a second can be lowered further by increasing the size of FIFO buffer 250 and by cutting back on the safety margin.

As in the first embodiment, instructions and the application program are synchronized using a combination of device control and positional feedback. For example, when a particular lesson is started, the command to play a voice phrase or sentence is issued to the data storage device 200 by tutorial program 41. This is achieved by indexing each phrase that needs to be accessed on the disc at authoring time. The required phrase index is then used to make the selection and program 41 retrieves and plays that particular phrase from the medium 202. While this phrase is playing, the tutorial program 41 determines the current inter-phrase position from the refills of buffer 204, as described. This information has a resolution of 1/75th of a second. Program 41 synchronizes other events such as automatic input to the target application, stop for student input, of display a video sequence on the screen. In this way it can synchronize any event within any position of a phrase. This synchronization information is created as part of the authoring process.

One problem that the tutorial program 41 must contend with in the second embodiment is the variety of computing devices. These range from a 8088 based devices capable of 0.3 MIPS (Millions of Instructions per Second) to high performance 486 devices capable of 15 MIPS or more. In addition to the variation in compute power, peripheral devices such as the video display and disk subsystems exhibit similar disparities. The problem is best described with an example: a particular application program launched from the operating system prompt may take up to 45 seconds to load on a slower computing device 22 while the same application may take only two or three seconds to load on a faster computing device. If the lessons are synchronized to a constant rate of voice playback (such as that from a CDROM, video tape, or audio tape) then there will be long periods of inactivity on faster computing devices and possible overloading of input on slower computing devices.

This problem is solved by a "wait on event" procedure. When a command is given to the data storage device 200 to play a phrase, it can be specified in that command whether the voice should continue with the next phrase, or "wait" at the end of the specified phrase for further instructions. This is locked into a similar wait event in the computing device 22. When an application (or feature) is launched by the computing device 22, then the device 22 waits until that particular command has been completed. The device 22 then signals the storage device 200 to continue with the next sentence. Through a series of "handshake" procedures such as this, different speed machines can run efficiently.

To implement a system as described it is necessary to control and synchronize all events that must occur simultaneously—voice, video, student input, and application control. This is achieved by the process of "authoring." As described above, authoring is the process of creating instructional software. An "authoring system" is an application program that allows non programmers to create course ware on a computer. Instead of "programming" the computer, the operator selects various predefined options from menus, responds to prompt messages, and selects various parameters provided by the "authoring system." This occurs in a controlled environment where the operator is insulated from the details of computer programming. The end result is a self contained tutorial program generated by the authoring system based on customizations made by the operator. This program can then be run on its own without further need of the authoring system.

The key to the authoring system is the Event Control File or ECF 74. The ECF invokes and synchronizes all requirements of a training course, including application input control, video, sound, and student input.

The ECF is closely tied to how the data delivery device is organized. In this implementation, a CDROM is used as the data storage device 200. A software driver communicates with the CDROM drive and sound generator 208 to provide a stream of data to the computing device 22 for video, data, etc., and to the sound generator 208 for playback of voice. This driver is structured to provide two main features: it retrieves data from any index point on the CDROM, and it "transparently" reads the current location of playback from the CDROM. This feature is transparent in that is does not affect the current mode of the CDROM. Many other features control the mechanical operation of the drive such as STOP, GOTO, VOICE ON, REWIND, etc. These features are provided by a layer of software that spans from low level communication with the CDROM (such as DMA control) to high level requirements of the ECF (read current position). The lower level software is structured to provide the information for the higher level functions. For example, the software that controls the DMA transfers also keeps a data count, this allows higher functions to detect what the current playback position is. In general, these control features are initiated by the student navigating through the course rather than from the ECF.

The ECF is built during the authoring process described previously, the voice and all video sequences are built and labeled, and all student interactions and help messages are created first. The course is then authored in a real time mode. The authoring system records all the actions of the author and synchronizes them to the voice channel. As an example, if the author were to demonstrate some feature of the application, then the authoring system would record the exact sequence of events and play them back at the same time on the voice track that they were carried out by the author. The author listens to the voice track and carries out the instructions, the authoring system records these sequences so that the playback system can replay them. The author can also use special sequences to invoke a graphic or student response, these events are not input to the application during playback but are merely instructions to the playback system itself. A final step is to position and label all the module, lesson, and task points in the course.

The authoring system provides all the tools necessary to create a training course. These tools include a graphics editor to build still images and animations, a video editor to edit captured motion video sequences, a Student Input Point (SIP) editor to create student response and help files, an ECF editor to edit the ECF 74 after an authoring sequence, and a random editor that allows the insertion of lesson and task points, menus, entry and exit events, etc.

Playback is accomplished under control of the ECF 74 in a manner previously described. When the training course is started, the CDROM begins to play from a selected lesson point found via offsets in RND file 78 (sound is now heard). The control portion of the tutorial program 41 continually compares the current voice position to entries in the ECF. If a match is found then the corresponding instruction in the ECF is carried out. For example, assume the first event is to present an introductory screen to the student. An entry exists in the ECF at time "one second" to show a graphic display, the voice begins "Welcome. . ." and after one second a graphic display appears. Another example illustrates how the ECF 74 controls the application program 46. Assume that the application program is a word processor and that in Lesson 1 there exists a "write" command to start it. The voice announces "Now I will start the word processor by entering W-R-I-T-E. . .". The entire sentence and especially the letters W-R-I-T-E occur at the particular time positions on the CDROM disc. The resolution of this position goes down to 1/75th of a second, assume that the position for the letters is as follows:

| Letter | Lesson | Minute | Second | Frame |
|--------|--------|--------|--------|-------|
| W -    | 1      | 2      | 23     | 30    |
| R -    | 1      | 2      | 24     | 02    |
| I -    | 1      | 2      | 24     | 38    |
| T -    | 1      | 2      | 25     | 01    |
| E -    | 1      | 2      | 25     | 32    |

These letters occur about every half second, which is how quickly the voice narrates them. The ECF 74 has these same letters stored at the above shown time codes. When the first part of the sentence is playing the playback system is monitoring the time position, no corresponding entries are found in the ECF so nothing happens other than voice. When position lesson 1, minute 2, second 23 and frame 30 is reached, however, a corresponding entry exists in the ECF. The system determines if this is a special instruction or an act previously recorded that should be sent directly to the application. In this situation, the latter is the case and the letter "W" is retrieved from the ECF. The playback system now sends this key to the application just as if someone has pressed the letter "W." The "W" therefore appears on the screen synchronized with the narration. This process continues for the remaining characters, each appearing in exact synchronization with the narration. Because the letters are entered into the system as if the operator had typed them, the system carries out the requested function as it normally would. During this process, the keyboard 28 is locked out so that the student does not inadvertently enter additional keystroke information.

Having described and illustrated the principles of the invention with reference to preferred embodiments and several variations thereon, it is apparent that such embodiments can be modified without departing from such principles. For example the latch 210 may be incorporated into the computer port directly, may be separate, or may be incorporated into the DAC 214. The electronics components may be discrete devices or fabricated into an integrated circuit. The memory for storing sampling data retrieved from the medium 202 may be the memory 38 or any other data storage device.

In view of these and the wide variety of other embodiments to which the principles of the invention can be applied, the illustrated embodiments should be considered exemplary only and not as limiting the scope of the invention. I claim as the invention all such modifications as may come within the scope and spirit of the following claims and equivalents thereto.

I claim:

1. An apparatus for playing audio output through a computing device while a central processing unit of the computing device concurrently runs a computer program, comprising:
   memory comprising dual data buffers operable so that one buffer receives audio sampling data from a data source for temporary storage while the other buffer passes the stored audio sampling data to provide a continual source of audio sampling data is memory;
   a latch for latching the audio sampling data stored within the memory;
   a timer separate from the central processing unit for transferring the sampling data into the latch at a sampling rate; and
   a digital-to-analog converter for converting the latched sampling data to a corresponding analog signal,
   the central processing unit thereby free to concurrently run a computer program independent of the playing of audio output through the computing device.

2. The apparatus of claim 1 wherein the memory is operable to receive sampling data from a data storage medium without such data passing through the central processing unit.

3. The apparatus of claim 1 wherein the latch is operable to receive sampling data from the memory without such data passing through the central processing unit.

4. The apparatus of claim 1 including a FIFO buffer coupled between the memory and the latch for receiving sampling data from the memory and transferring it to the latch, the FIFO buffer operable to receive the sampling data at a rate faster than the sampling rate at which the timer transfers data from the FIFO buffer to the latch.

5. The apparatus of claim 1 wherein the timer is programmable to provide a selected sampling rate.

6. The apparatus of claim 5 wherein the selected sampling rate is included in data sent to the timer in advance of the sampling data sent to the latch.

7. The apparatus of claim 1 including a transducer for producing sound or video output from the analog signal.

8. The apparatus of claim 1 including a digital data storage device for providing access to the data on the data storage medium.

9. A training system for providing audio or video instruction for a computer program through a computing device while a central processing unit of the computing device concurrently runs the computer program, comprising:
   a digital data storage medium containing audio or video instructional data;
   dual data buffers for receiving the instructional data from the data storage medium, the buffers operable so that one buffer provides instructional data while the other buffer receives instructional data;
   a latch for latching instructional data provided by the dual data buffers;
   a timer separate from the central processing unit for transferring the instructional data into the latch at a sampling rate; and
   a digital-to-analog converter for converting the latched instructional data to a corresponding analog signal representing the audio or video instructions,
   the central processing unit thereby free to concurrently run the computer program independent of the playing of the audio or video instructions through the computing device.

10. The training system of claim 9 including a digital data storage device for communicating the instructional data on the data storage medium to the dual data buffers.

11. The training system of claim 9 wherein the data storage medium comprises a compact disc and the training system includes a CDROM drive for communicating the instructional data to the dual data buffers.

12. The system of claim 9 wherein the dual data buffers receive data from the data storage medium without such data passing through the central processing unit.

13. The system of claim 9 wherein the latch receives instructional data from the dual data buffers without such data passing through the central processing unit.

* * * * *

UNITED STATES PATENT AND TRADEMARK OFFICE
CERTIFICATE OF CORRECTION

PATENT NO. : 5,228,859

DATED : July 20, 1993

INVENTOR(S) : T. Peter Rowe

It is certified that error appears in the above-identified patent and that said Letters Patent is hereby corrected as shown below:

Col. 21, line 23, "is memory" should be --in memory--.

Signed and Sealed this

Nineteenth Day of April, 1994

Attest:

BRUCE LEHMAN

Attesting Officer     Commissioner of Patents and Trademarks